Dec. 5, 1939.  E. P. POLUSHKIN  2,182,235
HARDNESS TESTER
Filed Oct. 19, 1936  2 Sheets-Sheet 1
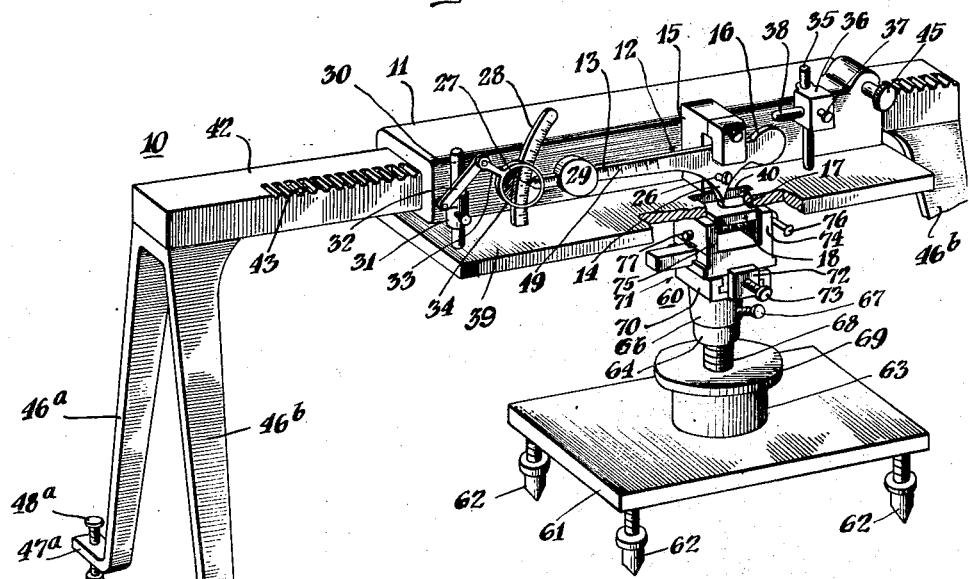
INVENTOR
Eugene P. Polushkin
BY
Furman Rinehart
ATTORNEY Dec. 5, 1939.  E. P. POLUSHKIN  2,182,235
HARDNESS TESTER
Filed Oct. 19, 1936   2 Sheets-Sheet 2
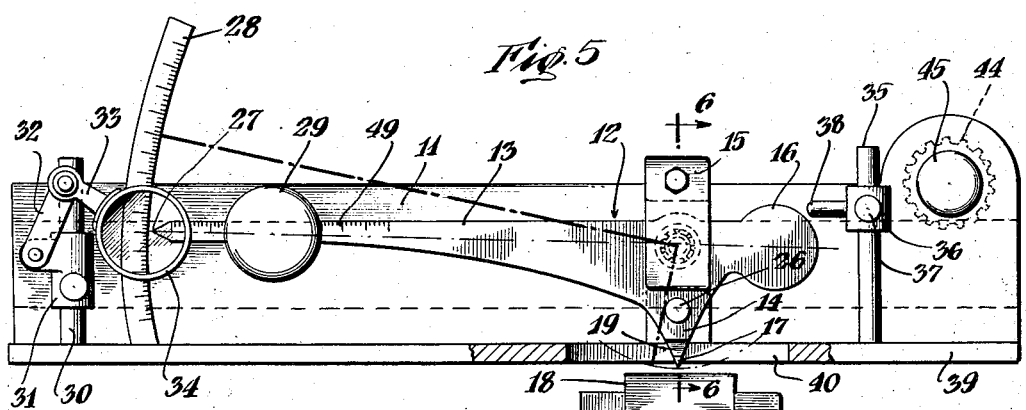
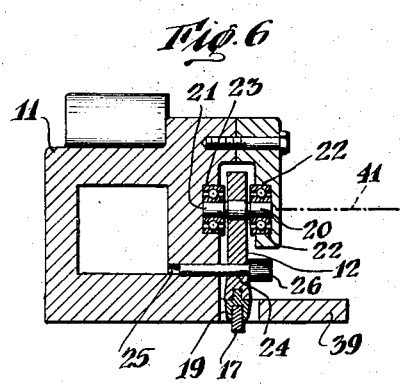
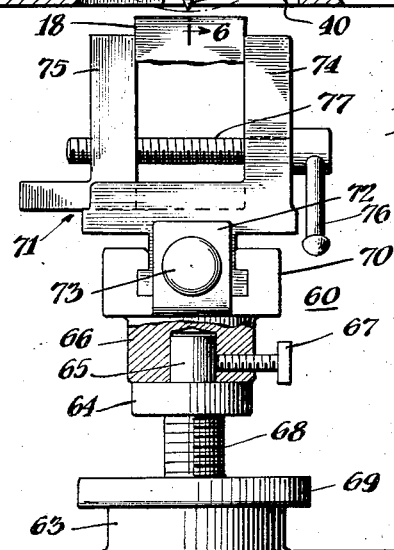
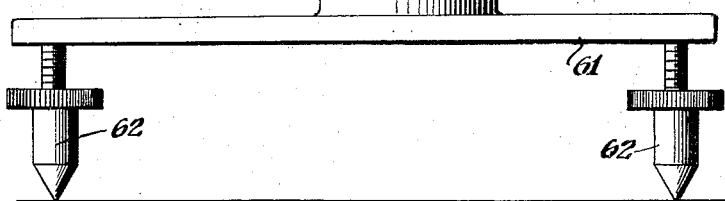
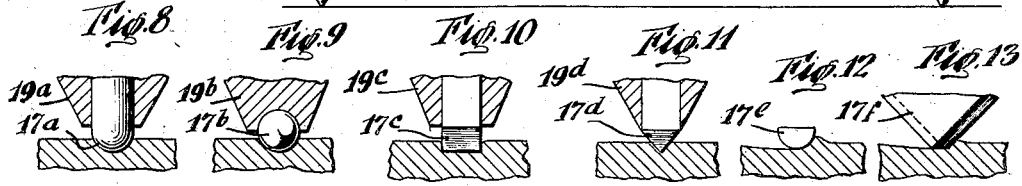
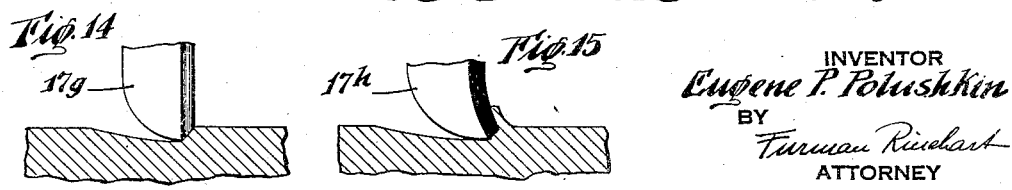
INVENTOR
Eugene P. Polushkin
BY
Furman Rinehart
ATTORNEY Patented Dec. 5, 1939

2,182,235

UNITED STATES PATENT OFFICE 2,182,235

HARDNESS TESTER

Eugene P. Polushkin, New York, N. Y.

Application October 19, 1936, Serial No. 106,330

10 Claims. (Cl. 265—16)

This invention relates generally to testing the hardness of materials and more specifically to apparatus for measuring the hardness of metals.

Two methods are commonly used for testing hardness. In one, which is often called the "indentation" method, a hard ball, diamond cone or pyramid, or the like, is pressed into the material being tested, and the diameter or depth of indentation is taken as a factor of hardness. A numerical value of hardness is obtained by dividing the applied pressure by a spherical area of indentation. This principle is used in determining hardness with the Brinell machine. In the second method, often called the "scratch" method, the surface of the material being tested is scratched with a sharp pointed instrument, and hardness may be measured on the basis of the relationship between the width of scratch produced under a constant load, or on the basis of the required load to produce a scratch of constant width.

In accordance with this invention hardness of materials, particularly metals, may be determined by both of the foregoing general methods. That is to say, means are provided whereby both indentation hardness and scratch hardness may be determined.

Further, the invention provides apparatus which might be termed "universal" in its character, in that, by simple modification, one machine may be used to determine scratch hardness, indentation hardness, cutting hardness or comparable machinability characteristics of different materials.

One embodiment of the invention serving to indicate the principles comprehended by the invention may comprise a pivotly mounted angular lever consisting of two arms of unequal length. One arm, herein called the "tracing" arm is designed to carry a member of hard material and suitably shaped to contact and arcuately penetrate the material being tested; the other, herein called the "indicating" arm or beam, is designed to cooperate with the movement of the tracing arm, and is preferably longer than the former. Moreover, the movement of the end of the tracing arm contacting the material being tested although it may be very slight is mechanically magnified with resulting facilitation of accurate measurement. Provision is made to support a movable load along the indicating beam whereby to produce a determinable torque on the lever. A scale mounted near the free end of the indicating beam further assists in easy measurement of the relative movement of the tracing arm and may, if desired, be supplemented by suitable magnifying devices for additional accuracy in reading.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a partial view in perspective and partly in section of one form of apparatus;

Figs. 2, 3 and 4 are diagrams to facilitate theoretical discussion;

Fig. 5 is a view in elevation showing particularly the tracing and indicating arms;

Fig. 6 is a view on line 6—6 of Fig. 5;

Fig. 7 is a view in elevation of the apparatus for holding and adjusting the test piece;

Figs. 8 to 15 are views in elevation and partly in section of various shapes of indentors.

In the following description and in the claims, various details will be identified by specific names for convenience, but they are intended to be as generic in their application as the art will permit. Like reference characters denote like parts in the several figures of the drawings.

Theory of the tester

The general scheme of the invention may be had by reference to Fig. 2. It will be understood that the theoretical discussion which is to follow is for purposes of explanation primarily. Some elements are referred to as being represented in Figs. 2, 3 and 4 although these figures are diagrammatic in their nature. Such references are to be considered in connection with the specification as a whole and are explained in further detail elsewhere herein. For example, the lever heretofore mentioned is represented by the angular lines ACB (Fig. 2). It is mounted at pivot C and consists of two unequal sides: a short one AC, herein called "tracing" arm, and a long one BC, herein called "indicating" arm or beam. Fig. 2 shows this lever in skeletonized or diagrammatic form in two extreme positions represented by ACB and $A_1CB_1$.

In position ACB the tracing arm leans against the plane surface of the material to be tested (represented by X), whereas the indicating arm supports a load $w$ which tends to rotate the lever. Rotation is prevented, however, by the resistance of the material that holds end A of tracing arm stationary. The nature of the resistance depends on the shape of end A (called the indentor); if the latter has a sharp cutting edge, the material resists cutting; but if the indentor has a spherical shape, the material resists indentation. In either case pressure $p$ exerted by the indentor on the material is a function of torque $m$:

$$m = w \times Co_1 = wR_1 \cos \alpha \qquad (1)$$

when $R_1$ is a distance from the center of rotation C to the center of gravity of the load $w$, and $\alpha$ is the inclination angle of the lever.

Equilibrium requires that the moment of resistance ($p' \times r$) be equal to $m$; as $p'$ is equal to $p$:

$$pr = wR_1 \cos \alpha$$

or $$p = \frac{wR_1 \cos \alpha}{r} = \frac{m}{r} \qquad (2)$$

when $r$ is the length of the tracing arm.

In this instance let it be assumed that the indentor is round. Under pressure $p$ it will slightly penetrate into the material, as illustrated in Fig. 3. If the torque is increased by moving load $w$ to the left along the indicating arm, pressure $p$ will also increase and, as a result, the depth of penetration will be greater; at the same time the tracing arm will slightly move toward perpendicular CF, and, therefore, the inclination angle will be somewhat smaller (see Fig. 3). This effect will be observed every time the torque is increased. Consequently, for each value of the torque there would be a certain depth "$s$" of penetration and a certain inclination angle $\alpha$. The depth of penetration depends on the hardness of the material. If the diameter of the round indentor (or width of the sharp-edged indentor) remains constant, the ratio of pressure to depth of penetration would represent a measure of hardness $h$:

$$h = \frac{p}{s} = \frac{m}{rs} = \frac{wR_1 \cos \alpha}{rs} \qquad (4)$$

$h$ is called proportionate hardness number. In Formula 4 $r$ is constant, $w$ is known, $R_1$ and $\alpha$ are read off the scales of the instrument and $s$ is calculated from Formula 5 given below:

$$s = r(\cos \alpha_1 - \cos \alpha_0) \qquad (5)$$

This formula represents the geometrical relation between depth of penetration $s$, initial value of inclination angle $\alpha_0$ and the new value of inclination angle $\alpha_1$, after penetration of the indentor into the material a depth $s = s_0 - s_1$; where $s_1$ is the sagitta of angle $\alpha_1$ and $s_0$ is the sagitta of angle $\alpha_0$ (see Fig. 3). Both values $s_0$ and $s_1$ are indicated by the same scale. As will appear later, the apparatus provided by this invention is very sensitive to even a slight change of the inclination angle. Any change may be accurately registered on a scale which may be used in connection with the indicating arm described more in detail hereinafter.

The proportionate hardness number may be interpreted in two different ways: (1) as the pressure which is required to produce a constant depth of penetration by a standard indentor or (2) as the depth of penetration caused by a constant pressure, assuming that all other conditions remain the same.

In accordance with the invention another measure of hardness may be obtained in the following manner. If instead of determining depth of penetration after each increment of the torque, the torque is increased continually, the pressure of the indentor will finally overcome the resistance of the material. At this moment the lever will suddenly drop, and the indentor will produce a circular groove (or a scratch in the event that the contacting member has sharp edges) on the surface of the material. Pressure $P_1$ which causes the drop of lever is herein called critical pressure, and ratio $$\frac{P_1}{s_1}$$

where $s_1$ (see Fig. 2) is maximum depth of circular groove (or scratch), is called critical hardness number ($h_1$).

The formula of critical hardness number is similar to Formula 4.

$$h_1 = \frac{P_1}{s_1} = \frac{m_1}{rs_1} = \frac{w_1 R_1 \cos \alpha_1}{rs_1} \qquad (6)$$

when $s_1$ is maximum depth of the circular groove (or scratch).

Geometrically, $s_1$ is the sagitta of an arc $AA_1$ (Fig. 2) described by the end of indentor in its movement. The value of $s_1$ can be determined from Formula 7:

$$s_1 = r(1 - \cos \alpha_1) \qquad (7)$$

In both Formulas 6 and 7:

$\alpha_1$ is the value of inclination angle $\alpha$ at the last moment of equilibrium;

$m_1$ is the value of torque at which rotation started;

$w_1$ is the load which produced the fall of the lever;

$R_1$ is the distance between the center of gravity of the load and the center of rotation C; and $r$ is constant length of tracing arm.

In order to calculate $h_1$ it is necessary only to take readings of $\alpha_1$ and $R_1$ on the scales; all other factors are either known or can be easily determined by calculation. It will be understood that in actual practice, values of $s$ and $s_1$ will have been set down in convenient tables.

When using a round indentor proportionate hardness number is comparable to Brinell or Rockwell hardness numbers, although numerically they may be different. In both the Brinell and Rockwell methods pressure is applied perpendicularly to the surface of the material whereas in accordance with this invention it is applied obliquely.

Critical hardness number (heretofore mentioned) is essentially different. It is a measure of the minimum lateral pressure required to overcome the resistance of the material to the movement of the tracing arm or it is a measure of the maximum lateral pressure which the material can withstand.

Critical pressure $P_1$ which starts the fall of the lever, has been reached by gradual increase of the torque. But the same result can be obtained if the test piece is gradually lowered. As an alternative, an equivalent effect may be obtained by raising the centre of rotation C. Indeed, when the specimen is being lowered, the surface layer of material, which withstands the pressure of the indentor, becomes gradually thinner, and thus its resistance is being reduced (see Fig. 4); finally the layer becomes so thin that it cannot hold the pressure any longer, and at this instant the lever will start to move. Every material has its own ratio $$\frac{P_1}{s_1}$$

characteristic of its hardness, at which rotation of the lever starts. This ratio can be determined either by gradual increase of the torque, as stated before, or by gradual decrease of the depth of penetration, in a manner just described.

Both proportionate hardness number and critical hardness number are releated to hardness of materials and should be considered as supplementary to each other. If the test be made with a round indentor such as illustrated diagrammatically in Fig. 3, these numbers refer to indentation hardness; but if a sharp pointed indentor be used, they refer to scratch or cutting hardness. To make the results comparable, it is preferable that the indentors have standard dimensions.

One of the distinctive features of this invention is that provision is made to magnify the depth of penetration by mechanical means. The degree of magnification will depend on two factors: (a) geometrical relation between the arc and the sagitta (Formulas 5 and 7) and (b) ratio of arms $$\frac{R}{r}$$

where R is full length of the indicating arm or distance from the center of rotation to the end of the indicating arm and $r$ designates the length of the tracing arm. For very small inclination angles magnification may be more than a thousand times, if $$\frac{R}{r}=5$$

For this reason, depth of scratches and grooves made in determination of hardness in accordance with the invention can be extremely small, as for instance, a half of micron. Consequently, very thin and small specimens can be tested. If desirable, the effect of slight roughness of the surface may be overcome by a preliminary run of the indentor which prepares a smooth path for the final test.

*Construction of the tester*

Having discussed some theoretical aspects of the invention reference is now made to the construction of one embodiment of the invention for further clarification and illustration. It will be understood that the description is primarily illustrative and is not intended to be construed by way of limitation.

Referring again to the drawings, 10 represents the frame upon which the carrier 11 for the lever 12 is mounted. This lever comprises an indicating arm 13, a tracing arm 14 at approximately right angles thereto and pivotally mounted in a bracket 15 fixed to the carrier 11. It is also provided with a counterbalance 16. Removably fixed to the tracing arm 14 is a contact member 17 (herein sometimes called "indentor") which is designed to arcuately penetrate the material 18 being tested. The free end of the tracing arm 14 is preferably equipped to carry a holder 19 (see Fig. 6) which in turn is designed for mounting the indentor 17. The indentor may be of various shapes, depending upon the particular characteristics of the test piece which are to be determined. Fig. 8 shows in part a holder 19a with a cylindrical indentor having a spherical working surface 17a. Fig. 9 shows in part a holder 19b having a spherical indentor 17b mounted therein. Fig. 10 shows a holder 19c and an indentor 17c in the form of an inverted gable. Fig. 11 shows a pointed indentor 17d particularly adapted to determine scratch hardness; Fig. 12 illustrates the effect produced by a rounded indentor 17e; Fig. 13 shows the effect produced by indentor 17f. Fig. 14 is an indentor 17g partially rounded and Fig. 15 shows an indentor 17h enlarged and partially scooped out. The two latter types are adapted for determining cutting hardness or machinability.

In actual practice the indentors are of relatively very hard material and will be relatively small. Hence it is preferable to mount each indentor permanently in a separate holder such as disclosed at 19. Then the holders may be easily interchanged in the tracing arm 14.

The lever 12 at its pivoting locus has extending outwardly therefrom on either side an axle 20 and 21 mounted in ball bearing journals 22 and 23 (see Fig. 6). Beneath the pivot is an opening 24 in the lever registerable with an opening 25 in the carrier 11 for the insertion of a pin 26 to hold the lever stationary in a neutral position when it is desired to produce a scratch or groove of constant depth.

The indicating arm 13 at its free end opposite the counterbalance 16 is provided with an indicator or pointer 27. The indicating arm is also provided with a scale 49. A weight 29 designed to be moved along said indicating arm may be used to increase or decrease the torque of the tracing arm about the pivot provided by the axles 20 and 21. Behind the indicator 27, mounted on the carrier 11 is an arcuate indicating scale 28 for measuring the arc of the inclination angle from which the depth of penetration can be determined. Also mounted on the carrier 11 is a device for magnifying the arcuate scale readings. It comprises a post 30 having a slider 31 mounted thereon and vertically adjustable. Extending from and fixed to the slider 31 is an arm 32 which in turn is movably fixed to an arm 33 holding a magnifying glass 34. Consequently, the magnifying glass which may also take the form of a microscope is capable of movement all along the arcuate scale 28.

Also mounted on the carrier 11 is a stop device which comprises a post 35, a slider 36 mounted thereon for vertical movement thereon, and a set screw 37 to hold said slider in fixed position. A pin 38 extending horizontally from said slider 36 is adapted to engage a counterbalance 16 in any desirable position to prevent undue movement of the lever 12.

Also mounted on the carrier 11 is a base plate 39 provided with an elongated slot 40 and positioned to permit of movement of the free end of the tracing arm 14 therein. The bottom surface of the base plate 39 is smooth and should be a true perpendicular to geometrical axis 6—6 (Fig. 5) of the tracing arm in its neutral position as it serves as a guide for adjustment of the test piece 18 when being tested. The lever 12 is mounted at such height that the indentor when its holder is fixed therein will extend below the bottom surface of the base plate 39 and describe an arcuate groove in the test piece when the lever 12 is turned on its axis 41.

The carrier 11 itself is generally of the form of a sleeve which slides over track member 42 of frame 10. The track member 42 is provided with a rack 43. Mounted in the carrier is a pinion 44 engaging said rack. The pinion is provided with a handle 45 which, when turned in the proper direction will cause the carrier 11 to move along said track 42. In this manner the position of the contact member 17 of the tracing arm may be translated horizontally any place along said track as may be desired. The track member 42 is mounted on legs 46a and 46b with flanges 47a and 47b. Mounted in the flanges are levelling screws 48a and 48b for adjusting the height and levelling of the frame.

For mounting the test piece 18 and to hold it in proper position for testing, there is provided a test piece mounting device referred to generally by the reference character 60 comprising a base 61 equipped with a plurality of levelling screws 62. Mounted on this base 61 is a jack screw base 63 in which is mounted a jack screw 68. Rotatably mounted on the jack screw 68 is a cylindrical vise base 66 which rests upon a collar 64 fixed to the jack screw. The vise base 66 may be clamped in fixed position by a set screw 67 engaging a pin 65 which is integral with the jack screw (see Fig. 7). A vise 71 is supported on a sub-base 70 fixed to the collar 64. A shoulder 72 and set screw 73 extending therethrough provides means for lateral translation of the position of the vise 71. The vise 71 comprises vise jaws 74 and 75 and vise handle 76 and clamping screw 77 for closing and opening said jaws and consequently providing means for clamping the test piece and holding it in fixed position. The collar 66 may be turned at any angle through a horizontal plane. It will now be apparent that the apparatus provides for universal movement relative to the test piece namely, lateral, longitudinal and vertical.

*Manipulation of the tester*

(1) *Levelling of the surface of specimens.*—The specimen is slightly clamped in the jaws of vise 71, then raised to the lower surface of the base plate 39 and pressed against it, until both surfaces completely coincide; in this position the specimen is clamped rigidly. During this operation, pin 38 holds the lever 12 inclined, so that indentor is raised above the base plate.

(2) *Checking up the accuracy of levelling.*—Pin 38 is pushed back, and the lever is released. Indentor 17 of tracing arm 14 now touches the specimen 18 and the tracing arm is in an inclined position. By micrometric jack screw 68 the specimen is gradually lowered until the tracing arm becomes perpendicular to its surface. In this neutral position indentor 17 can freely pass back and forth, without scratching the surface of the specimen, but only slightly touching it; indicator 27 of indicating arm 13 is at zero division of scale 28. To verify horizontal position of the specimen surface, the carrier 11 is moved forward and backward, by operating rack 43 and pinion mechanism 44. If, during this movement, indicator 28 remains stationary, the surface is perfectly levelled; if it moves away from zero in either direction, the levelling should be corrected by means of levelling screws 62. The position of the indicator on the scale is observed through magnifying glass 34.

(3) *Preliminary run.*—The purpose of this run is to eliminate the effect of natural roughness of the surface and to prepare a smooth path for the final run. The preliminary run is made under a lighter load (minor load) than the final. Indicating arm 13 is supported by hand in an inclined position while the specimen is being raised by means of jack wheel 69 and micrometric jack screw 68 to some height, then indentor 17 is placed on the specimen 18 and the vise 71 is gradually lowered until a definite arc is reached on scale 28. This arc corresponds to a desired depth of scratch which should be produced in preliminary run. A minor load is now placed on the indicating arm 13 at a certain division of the scale 49 (by means of the weight 29), and the carrier 11 is moved for a distance desired. Under the pressure of this minor load, the indentor will make a scratch (or groove) in the specimen of a lesser depth than required in the test.

Another variation of this procedure is as follows: When it is desired to produce a scratch or groove of a certain constant depth, the specimen is raised to equivalent height indicated on scale 28, the lever 12 is brought into neutral position by increasing the load, then pin 26 is inserted into hole 25 of carrier 11 and the vise 71 is moved for the length desired. At all other times the pin 26 is kept out of the hole.

In some instances the levelling of the surface and the preliminary run may be omitted, as for example, when the test line is very short.

(4) *The test.*—Further manipulation depends on the kind of test that it is desired to make.

(a) To determine proportionate hardness number $h$, which as stated heretofore is comparable to indentation hardness determined by Brinell and Rockwell machines:

The torque is increased by increments by moving weight 29 away from the pivot 41 (Fig. 6) along scale 49, and for each value of the torque a corresponding decrease of inclination angle is found on scale 28. Average $h$ is calculated from several determinations. Formulas 4 and 5 are applied.

(b) Critical hardness number $h_1$ of indentation or cutting hardness:

The specimen is lowered by micrometric jack screw 68 until the indicating arm 13 suddenly drops. Observing the movement of indicator 27 on the scale, a division is noted at which the lever began to fall. $h_1$ is calculated from Formulas 6 and 7.

(c) Continuous testing of indentation or cutting hardness:

In the two previous cases, hardness was tested only at some points of the surface. These local tests (likewise all tests made with Brinell and Rockwell machines) are not sufficiently charactecistic for a material in which physical properties vary at different points. Such materials should preferably be tested along continuous lines. In accordance with the invention this can be easily done. First, the critical pressure is determined (as in paragraph b), at which the lever drops; then the lever is loaded slightly less than required for critical pressure, and under this load it is moved on the surface of the specimen for a desired distance. At the same time indicator 27 is observed through magnifying glass 34. If hardness of the material is uniform along this line, the indicator will be stationary all the time. Any changes in hardness will slightly raise or lower the tracing point of indentor 17 and thus will move the indicator away from the starting division on the scale 28.

(d) Ordinary scratch test:

If the test is made under a constant pressure, the lever 12 loaded up to this pressure ($p$) is moved along the surface of the specimen for a desired distance. The depth of scratch is shown on scale 28. Variations of the depth, according to variations in hardness of the material, can be observed on scale 28 through the magnifying glass 34.

If the test is made with a constant depth of scratch, the lever 12 is loaded until indentor 17 penetrates to this depth. The pressure is calculated from the torque. Variations in hardness will be shown by the movement of indicator 27 on scale 28.

Structural features of this testing machine may vary according to practical requirements and the nature of prevailing tests. If greater accuracy is desired a small microscope may be provided instead of the magnifying glass, supported by adjustable sliding mechanism as described. For large machines it may be found desirable to use hydrostatic pressure instead of a dead load $w$.

It will be observed from the foregoing description that this invention provides for testing different kinds of hardness: indentation hardness, scratch hardness and cutting hardness. In this sense the apparatus may be termed "universal". Hardness is expressed as a ratio of pressure exerted on the material by an indentor to the depth of its penetration into the material, or as a ratio of the pressure to the maximum depth of arcuate scratch or groove produced by the indentor in its rotary movement.

The invention utilizes rotary movement for producing arcuate scratches in testing hardness. Likewise, straight or arcuate grooves may be used in testing hardness. The depth of scratches or grooves may be automatically magnified by the instrument itself and can be read directly on a scale, whereas, sclerometers now used require a high power microscope for measuring the width of scratches. The instrument can be set to draw a scratch or groove of any predetermined depth, either straight or arcuate.

The test does not require a large area for its application. A horizontal line one millimeter long, or even a fraction of a millimeter, will be sufficient for a local test. This permits testing hardness of the cutting edge of tools of any design and even small sizes without destruction of their surfaces. As the depth of penetration may be exceedingly small, hardness of very thin pieces or fine deposits of electroplated metals, or coatings of any kind on the surface of materials can be tested by this apparatus. The thickness of these pieces and layers can be determined also by the same test as hardness. Though smoothness of the surface may be an essential requirement in determining hardness, the effect of a rough surface may be overcome by a preliminary run of indentor which prepares a smooth path for the final test run.

Comparing this method with the established practice of testing indentation hardness by Brinell and Rockwell machines, a further advantage of utilizing this invention resides in applying it for continuous testing, i. e., testing hardness along continuous lines, instead of at selected points. Detection of hard and soft spots in the material is made possible in a single uninterrupted test.

Moreover, by reason of the application of pressure obliquely on the surface of the test piece, brittle materials such as glass, may be safely tested, whereas, the application of a comparable pressure perpendicularly against the surface is likely to crack or break the test specimen.

For the same reason the so-called "anvil effect" will be minimized if not entirely eliminated, and therefore very thin material sheets may be effectively tested in accordance with this invention.

Furthermore, in view of the fact that the apparatus provides for very large magnification of the movement of the tracing arm, the load required in testing may be relatively very small. This makes it possible to test very small pieces.

Also, it is possible to observe elastic and plastic deformations of materials under certain loads because when the load is removed the indicating arm will or will not return to its original position depending upon the absence or presence of residual deformation.

While certain novel features of the invention have been disclosed and are pointed out in the annexed claims, it will be understood that various omissions, substitutions and changes may be made by those skilled in the art without departing from the spirit of the invention.

What is claimed is:

1. Apparatus of the character described comprising a guideway, a carrier on said guideway, means to move said carrier along said guideway, a right angle lever pivotally mounted on said carrier having an indicating arm normally positioned parallel to said guideway and a tracing arm normally at substantially a right angle thereto, a specimen holding device including means to move the specimen to be tested in a plurality of planes to adjust the specimen into testing position relative to said tracing arm, means including a weight slidable on said indicating arm to increase the torque of said lever about its pivot and to urge the free end of said tracing arm to move in an arcuate direction through the surface of the specimen when positioned in testing position, and a scale adjacent the free end of said indicating arm positioned and graduated to measure the depth of penetration of the free end of said tracing arm into said specimen as a function of the movement of the free end of said indicating arm along said scale.

2. Apparatus of the character described, comprising a horizontally disposed support, a carrier movable horizontally along said support, a right angle lever pivotally mounted on said carrier having an indicating arm and a tracing arm substantially shorter than said indicating arm and normally substantially vertical, a specimen holding device including means to move said specimen in a plurality of planes, means including a weight slidable on said indicating arm to increase the torque of said lever about its pivot and to urge the free end of said tracing arm to move in an arcuate direction through the surface of a specimen when held in said holding device in testing position, a scale adjacent the free end of said indicating arm positioned and graduated to measure the depth of penetration of the free end of said tracing arm as a function of the movement of the free end of said indicating arm along said scale, and a stop device including a vertically adjustable member to maintain said lever temporarily at rest for adjustment of said lever and specimen relative to each other.

3. Apparatus of the character described comprising a support, a carrier on said support, means on said carrier engaging said support to move said carrier along said support, a right angle lever pivotally mounted on said carrier having an indicating arm and a tracing arm at substantially a right angle thereto, a specimen holding device including means to adjust a specimen in testing position relative to said tracing arm, a stop device on said carrier movable into and out of engagement with said lever to maintain said lever at rest when in engagement with said lever to facilitate adjustment of the specimen into testing position relative to said tracing arm, means including a weight slidable on said indicating arm to increase the torque of said lever about its pivot and to urge the free end of said tracing arm to move in an arcuate direction through the surface of a specimen when held in testing position and when said stop member is out of engagement with said lever, and a scale adjacent the free end of said indicating arm to measure the depth of penetration of the free end of said tracing arm through said surface as a function of the movement of the free end of said indicating arm along said scale.

4. Apparatus for testing hardness of materials comprising a support, a carrier mounted for horizontal movement on said support, means to move said carrier horizontally on said support, a base plate on said carrier, a lever having an indicating arm and a tracing arm, an axle pivotally mounting said lever on said carrier for swingable movement of said lever in a plane perpendicular to the plane of said base plate, a specimen holding device including means for movement of the specimen in a plurality of planes for adjusting the specimen in testing position relative to said lever, said base plate being adapted to serve as a guide to adjust the specimen relative to the movement of the free end of said tracing arm by bringing the upper surface of the specimen in contact with the under surface of said plate.

5. Apparatus for testing hardness of materials comprising a lever having an indicating arm normally substantially horizontally disposed and a tracing arm normally substantially vertically disposed, means mounting said lever for swingable movement about a pivot, a base plate mounted on said lever supporting means, a specimen holding device beneath said tracing arm, including means for movement of the specimen to be tested in a plurality of planes for adjusting the specimen in testing position relative to said lever, said base plate being adapted to serve as a guide to adjust the specimen relative to the movement of the free end of said tracing arm by bringing the upper surface of the specimen in contact with the under surface of said plate.

6. Apparatus of the character described comprising a horizontal guideway, a carrier mounted for movement on said guideway, means to move said carrier along said guideway, a base plate on said carrier, a lever including an indicating arm and a tracing arm having a spherically surfaced indentor mounted on its free end, a pivot axle pivotally mounting said lever on said carrier for swingable movement of said lever in a plane perpendicular to the plane of said plate, a specimen holding device including means for movement of the specimen in a plurality of planes and to adjust said specimen relative to said base plate; said base plate being adapted to serve as a guide to adjust the specimen relative to the movement of the free end of said tracing arm.

7. Apparatus of the character described comprising a support, a carrier mounted for horizontal movement on said support, a base plate on said carrier, an indicating arm and a tracing arm forming an angular lever, a pivot axle pivotally mounting said lever on said carrier for swingable movement of said lever in a plane perpendicular to the plane of said base plate and a specimen holding device including means for movement of the specimen in a plurality of planes relative to the under surface of said plate, the under surface of said base plate being adapted to serve as a guide to adjust the specimen relative to the movement of the free end of said tracing arm.

8. Apparatus of the character described comprising a support, a carrier mounted for horizontal movement on said support, a base plate on said carrier, an indicating arm and a tracing arm forming an angular lever, a pivot axle pivotally mounting said lever on said carrier for swingable movement of said lever in a plane perpendicular to the plane of said base plate, a specimen holding device including means for movement of the specimen in a plurality of planes relative to the under surface of said plate, the under surface of said base plate being adapted to serve as a guide to adjust the specimen relative to the movement of the free end of said tracing arm, and means defining an opening in said base plate to permit movement of the free end of said tracing arm therein.

9. Apparatus for testing the hardness of metals comprising a guideway, a carrier mounted for movement along said guideway, an angular lever mounted on said carrier for swingable movement about a pivot, said lever having an indicating arm normally positioned substantially horizontally and a tracing arm normally positioned vertically, means to increase the torque of said lever, a specimen holding device to maintain a specimen being tested in fixed position adjacent said tracing arm to permit the free end of said tracing arm to describe an arcuate groove beneath the surface of said specimen when the torque of said lever is increased sufficiently to overcome the resistance of said specimen, and means for shifting the position of said carrier on said guideway relative to said specimen whereby a fresh test surface may be reached by said tracing arm without changing the position of the test specimen.

10. Apparatus of the character described comprising an angular lever having an indicating arm and a tracing arm, means pivotally mounting said lever for swingable movement about an axis, an indentor holder mounted on said tracing arm, an indentor fixedly mounted in the free end of said holder, means to increase the torque of said lever about said axis, a specimen holding device to maintain a specimen being tested in fixed position adjacent said tracing arm to permit said indentor to describe an arcuate groove beneath the surface of said specimen when the torque of said lever is increased sufficiently to overcome the resistance of said specimen and means for shifting the position of said specimen relative to said indentor whereby a fresh test surface may be reached by said indentor.

EUGENE P. POLUSHKIN.